(12) United States Patent
Konno et al.

(10) Patent No.: US 6,787,189 B2
(45) Date of Patent: Sep. 7, 2004

(54) PREPARATION OF C/SI/O COMPOSITE MATERIAL

(75) Inventors: Hidetaka Konno, Sapporo (JP); Mikio Aramata, Annaka (JP); Hirofumi Fukuoka, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/307,924

(22) Filed: Dec. 3, 2002

(65) Prior Publication Data

US 2003/0104131 A1 Jun. 5, 2003

(30) Foreign Application Priority Data

Dec. 3, 2001 (JP) ........................................ 2001-368167

(51) Int. Cl.⁷ .............................. B05D 3/02; B05D 3/04
(52) U.S. Cl. ........................ 427/377; 427/379; 427/387; 427/399
(58) Field of Search .................................. 427/377, 379, 427/387, 399

(56) References Cited

U.S. PATENT DOCUMENTS 5,037,699 A * 8/1991 Ichikawa et al. ........... 428/408
5,582,781 A * 12/1996 Hayward ..................... 264/28
6,225,248 B1 * 5/2001 Leiser et al. ............... 501/95.2

* cited by examiner

*Primary Examiner*—Michael Barr
(74) *Attorney, Agent, or Firm*—Birch, Stewart, Kolasch & Birch, LLP

(57) ABSTRACT

A C/Si/O composite material having improved oxidation resistance is prepared by impregnating graphite with a crosslinkable silane or siloxane, causing the silane or siloxane to crosslink within the graphite, and heating at 300–1,200° C. in a non-oxidizing gas. The C/Si/O composite material can be efficiently prepared through simple steps, on an industrial scale and at a low cost and will find use as a high-temperature structural material by virtue of oxidation resistance.

5 Claims, No Drawings

PREPARATION OF C/SI/O COMPOSITE MATERIAL

This invention relates to a method for preparing a C/Si/O composite material having oxidation resistance and useful as heat resistant materials, heating materials, structural materials and lithium ion secondary cell negative electrode materials.

BACKGROUND OF THE INVENTION

On account of prominent characteristics including good electrical conduction, high-temperature strength, self lubricity, chemical stability and workability, carbon is an excellent high-temperature material which finds general use as metal melting crucibles, steel making electrodes, electrochemical electrodes, heaters, structural materials and lithium ion secondary cell negative electrode materials. However, carbon can be burn out in an oxidizing atmosphere at high temperatures, which problem restricts the application of carbon.

Recently, carbon-inorganic composite materials have been developed in order to improve the oxidation resistance of carbon without impairing the function of carbon itself.

Exemplary carbon-inorganic composite materials include inorganic coated carbon materials in which inorganic material such as $SiO_2$ or SiC is coated, SiC/carbon composite materials in which carbon-impregnated $SiO_2$ glass is reacted and converted to SiC, and carbon/ceramics composite materials obtained by mixing carbon sources with inorganic materials, such as carbon/$B_4C$ and carbon/$B_4C$/SiC.

It is true that the composite materials obtained by combining carbon with inorganic materials according to the above-mentioned methods are improved in oxidation resistance that carbon lacks. However, since they are composite materials with SiC based ceramics, their production requires reaction at relatively high temperatures, and the conditions under which SiC is formed must be carefully controlled. As a consequence, production on an industrial scale is difficult and the production cost increases, resulting in expensive products.

SUMMARY OF THE INVENTION

An object of the invention is to provide a method for preparing a C/Si/O composite material having oxidation resistance at a low cost.

It has been found that by impregnating graphite, which is known to selectively adsorb oily components, with a crosslinkable organosilicon compound and using the impregnated graphite as a precursor, rather than forming composite materials of carbon with SiC based ceramics as in the prior art, there is obtained a C/Si/O composite material having excellent oxidation resistance.

In a first aspect, the invention provides a method for preparing a C/Si/O composite material, comprising the steps of impregnating graphite with at least one organosilicon compound selected from crosslinkable silanes and siloxanes; causing the organosilicon compound to crosslink within the graphite; and heating the graphite at a temperature of 300 to 1,200° C. in a non-oxidizing gas for reaction to take place.

In a second aspect, the invention provides a method for preparing a C/Si/O composite material, comprising the step of further heat treating the C/Si/O composite material obtained by the method of the first aspect at a temperature of 800 to 1,600° C.

In the method for preparing a C/Si/O composite material according to the first or second aspect, the crosslinkable organosilicon compound is preferably an addition reaction curing organopolysiloxane composition or a curable silicone resin. The graphite is most often expanded graphite.

DESCRIPTION OF THE PREFERRED EMBODIMENTS

The method for preparing a C/Si/O composite material according to the invention starts with one or more organosilicon compound selected from crosslinkable silanes and siloxanes, and involves the steps of impregnating graphite therewith, causing the organosilicon compound to crosslink within the graphite, heating the graphite at a temperature of 300 to 1,200° C. in a non-oxidizing gas for reaction to take place.

The organosilicon compound used herein may be any silane or siloxane as long as it has at least two crosslinkable functional groups attached to silicon atoms within the molecule, for example, aliphatic unsaturated groups (such as alkenyl groups), hydroxyl groups, hydrogen atoms, hydrolyzable groups, and combinations thereof. The organosilicon compound may be linear, branched or cyclic. Illustrative are linear organopolysiloxanes having the following general formulae (1) and (2), branched organopolysiloxanaes having the following general formula (3), cyclic organopolysiloxanes having the following general formula (4), silanes having the following general formula (5), and silicone resins.

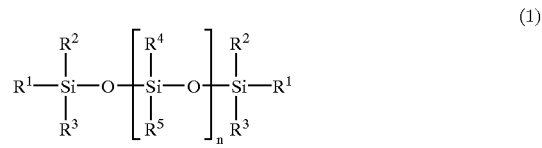

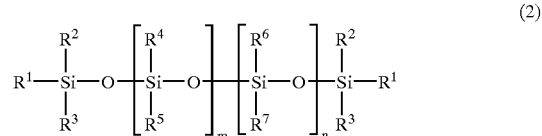

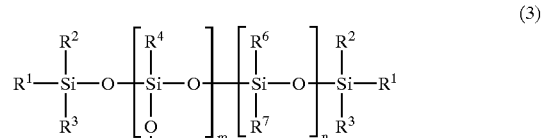

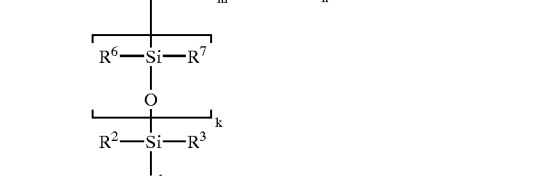

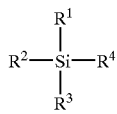

(5)

In the formulae, $R^1$ to $R^7$ are each independently hydrogen, a hydroxyl group, hydrolyzable group or monovalent hydrocarbon group. The preferred hydrolyzable groups are those of 1 to 6 carbon atoms such as alkoxy, alkenyloxy and acyloxy. The monovalent hydrocarbon groups include, but are not limited to, alkyl, alkenyl, alkynyl, aryl, and aralkyl groups of 1 to 12 carbon atoms, especially 1 to 8 carbon atoms, for example, alkyl groups such as methyl, ethyl, propyl, butyl and hexyl; alkenyl groups such as vinyl, allyl, butenyl, hexenyl, and cyclohexenyl; aryl groups such as phenyl and tolyl; and aralkyl groups such as benzyl and phenylethyl.

In the formulae, m, n and k are numbers in the range of 0 to 2,000, preferably 0 to 1,000, p and q are numbers in the range of 0 to 10, and p and q are not equal to 0 at the same time. Preferably p+q is 3 to 10.

These organosilicon compounds are desirably liquid. However, solid organosilicon compounds such as silicone resins are also acceptable as long as they have a softening point. Also, the organosilicon compound may be used as a dilution in organic solvents or non-reactive silicone oil in which the compound can be dissolved. Exemplary organic solvents are toluene and xylene, and a typical non-reactive silicone oil is dimethylpolysiloxane oil.

The crosslinkable silane or siloxane used as the starting reactant is not critical as long as it is usable in conventional silicone manufacture. Often, chain-like polymers of organosilicon compounds such as organosiloxane polymers have the propensity that especially when heated in a non-oxidizing gas stream, the backbone bonds readily undergo thermal cleavage and the polymer decomposes into low molecular compounds (e.g., cyclic compounds of three to six monomeric units) which are volatile. In contrast, silicon-carbon bonds formed by hydrosilylation reaction, for example, are resistant to heat; if they are crosslinked to a substantial degree by heating, decomposition into low molecular compounds is hindered; and even if decomposition occurs, decomposed species are less volatile because of a high degree of crosslinking. This ensures that, during the firing step, the crosslinked compound can be effectively converted into inorganic material without volatilization. Preferred for this reason is an addition reaction curing type organopolysiloxane composition comprising a silane and/or siloxane of any of the above formulae (1) to (5) and having at least two, preferably at least three SiH groups within the molecule, and a silane and/or siloxane of any of the above formulae (1) to (5) and having at least two aliphatic unsaturated groups (such as alkenyl and alkynyl) within the molecule, which undergoes hydrosilylation reaction to form a crosslinked product in the presence of a well-known hydrosilylation catalyst (such as platinum or a platinum compound) and within graphite. It is also preferred to use silicone resins having hydrolyzable groups such as hydroxyl, alkoxy or acyloxy groups within the molecule and capable of condensation through catalytic reaction or non-catalytic reaction to a high degree of crosslinking.

The organosilicon compound (silane, siloxane or mixture thereof) used as the starting reactant is desirably of the following average formula:

$C_xH_ySiO_z$ wherein x, y and z are positive numbers, preferably satisfying x−z >0.

Specifically, reaction to form silicon carbide takes place according to the following scheme.

$$C_xH_ySiO_z \to SiC + zCO + \frac{y}{2}H_2$$

Theoretically, x−z=1 is preferred although complete conversion to silicon carbide is not necessary. However, since graphite also contributes as a carbon source and hydrosilylation reaction entails a little loss, it is desired to use a silane, siloxane or mixture thereof in which x−z is greater than 0, preferably a silane, siloxane or mixture thereof in which x−z is from 0.9 to 1.5, and more preferably from 1.0 to 1.2. If x−z is not more than 0, the proportion of oxygen in the starting reactant becomes greater, probably resulting in a reduced yield and losses of some properties such as electric conductivity. If x−z is greater than 1.5, there may form a C/Si/O composite material having a higher carbon content, also resulting in a reduced yield. Then 0<x−z≦1.5 is preferred.

According to the invention, once graphite is impregnated with the organosilicon compound, heat curing or catalytic reaction is carried out to cure the organosilicon compound into a highly crosslinked product. The graphite subject to impregnation is not critical as long as it has pores. Expanded graphite capable of adsorbing a several ten fold volume of oily liquid is preferred for productivity and efficiency. The heat curing or catalytic reaction may be carried out under any set of well-known conditions, depending on the type of crosslinkable organosilicon compound. In the case of addition reaction curing organopolysiloxane compositions, heat curing is preferred, with curing at a temperature of 50 to 500° C., especially 80 to 400° C. being desirable. In the case of curable silicone resins, they may be cured at room temperature or elevated temperature.

Next, the highly crosslinked product is heated in a non-oxidizing gas atmosphere at a temperature of 300 to 1,200° C., preferably 400 to 1,100° C. If the heating temperature exceeds 1,200° C., unreacted and thermally decomposed compounds generate suddenly, failing to obtain a C/Si/O composite material having improved oxidation resistance. The non-oxidizing gas atmosphere may be an inert gas such as nitrogen, argon and neon. The treating time is preferably 10 minutes to 10 hours, especially 30 minutes to 5 hours.

By heating the impregnated graphite at the above temperature for reaction, there can be obtained a C/Si/O composite material having improved oxidation resistance as demonstrated by a weight loss of up to 10%, especially up to 1%, on heating in air at 1,000° C. A significant weight loss occurs at the initial stage and little at later stages. The C/Si/O composite material can be used as such depending on a particular purpose or application. For an application where oxidation resistance is desired from the first, the C/Si/O composite material is further treated at a higher temperature whereby a C/Si/O composite material having outstandingly improved oxidation resistance is obtained. For the further heat treatment, the temperature is higher than that used for the heat treatment in an non-oxidizing gas atmosphere and preferably falls in the range of 800 to 1,600° C., especially 1,000 to 1,300° C. Treating temperatures below 800° C. may achieve little improvement in oxidation resistance because stabilization by oxidation of unstable sites in the C/Si/O composite material is insufficient. Treating temperatures above 1,600° C. may entail no further effects, a difficult choice of furnace material, and an increased electric power cost. The treating time is preferably 10 minutes to 10 hours, especially 30 minutes to 5 hours.

The manufacturing system is not critical and may be continuous or batchwise. Specifically, a choice may be made among a fluidized bed reactor, rotary furnace, elevated moving bed reactor, tunnel furnace and batch furnace, depending on a particular purpose.

The ratio of the respective components in the C/Si/O composite material according to the invention may be controlled over a range by the choice of the starting reactant and the like. For oxidation resistance and electric conductivity, the preferred C/Si/O composite material consists essentially of 5 to 85% by weight of carbon, 5 to 70% by weight of silicon, and 3 to 60% by weight of oxygen, totaling to 100%, and more preferably 10 to 70% by weight of carbon, 10 to 60% by weight of silicon, and 5 to 50% by weight of oxygen, totaling to 100%.

The C/Si/O composite material of the invention consists essentially of carbon, silicon and oxygen. The term "consisting essentially of carbon, silicon and oxygen" as used herein means that other elements are absent, although amounts acknowledged as incidental impurities are permissible. Specifically, the content of other elements is not more than 1% by weight, especially not more than 0.1% by weight.

The C/Si/O composite material of the invention often has improved oxidation resistance which has never been accomplished in the prior art, as demonstrated by a weight loss of up to 10%, especially up to 1%, on heating in air at 1,000° C. The C/Si/O composite material of the invention is characterized in that the weight loss on heating in air at 1,000° C. occurs instantaneously and does not occur subsequently. The probable reason is that unstable sites remaining in the C/Si/O composite material have been stabilized through oxidation reaction. If the weight loss on heating in air at 1,000° C. is more than 10%, the composite material cannot tolerate service in a hot air environment when used as a heating material for heaters or a structural material for reactor core tubes, and is limited to the application in a non-oxidizing atmosphere.

The C/Si/O composite material is also characterized by an electric conductivity of $1 \times 10^{-5}$ to $10^3$ Ωcm, especially $1 \times 10^{-4}$ to $10^2$ Ωcm, and a thermal conductivity which is fairly higher than those of conventional carbon composite materials. By virtue to such high thermal conductivity, the C/Si/O composite material can find an application where electric conductivity is required such as heating material and lithium ion secondary cell negative electrode material.

EXAMPLE

Examples of the invention are given below by way of illustration and not by way of limitation.

Example 1

To 4.4 g of expanded graphite having a particle size of about 130 μm was added a solution in 50 g of toluene of an addition reaction curing organopolysiloxane composition containing in admixture 43 g of a methylvinylcyclosiloxane (LS-8670 by Shin-Etsu Chemical Co., Ltd., 1,3,5,7-tetramethyl-1,3,5,7-tetravinylcyclotetrasiloxane) and 31 g of methylhydrogensilicone oil (KF-99 by Shin-Etsu Chemical Co., Ltd.), with 100 ppm of a platinum catalyst added. Thorough mixing caused the expanded graphite to adsorb (or be impregnated with) the composition. The composition was then cured by heating in air at 300° C. for one hour. Subsequent heat treatment in an argon atmosphere at 1,000° C. for one hour yielded a C/Si/O composite material in powder form. The composite material was processed into pellets and fired in air at 1,000° C. for one hour. The yield and analysis results of the C/Si/O composite material before and after the firing step are shown in Table 1 together with the results of an oxidation resistance test of heating the C/Si/O composite material in air at 1,000° C. for 20 hours.

Example 2

To 4.4 g of expanded graphite having a particle size of about 60 μm was added a solution in 50 g of a silicone oil (KF-96 by Shin-Etsu Chemical Co., Ltd., 0.65 cs) of an addition reaction curing organopolysiloxane composition containing in admixture 43 g of a methylvinylcyclosiloxane (LS-8670 by Shin-Etsu Chemical Co., Ltd., 1,3,5,7-tetramethyl-1,3,5,7-tetravinylcyclotetrasiloxane) and 31 g of methylhydrogensilicone oil (KF-99 by Shin-Etsu Chemical Co., Ltd.), with 100 ppm of a platinum catalyst added. Thorough mixing caused the expanded graphite to adsorb (or be impregnated with) the composition. The composition was then cured by heating in air at 300° C. for one hour. Subsequent heat treatment in an argon atmosphere at 1,000° C. for one hour yielded a C/Si/O composite material in powder form. The composite material was processed into pellets and fired in air at 1,000° C. for one hour. The yield and analysis results of the C/Si/O composite material before and after the firing step are shown in Table 1 together with the results of an oxidation resistance test on the C/Si/O composite material in air at 1,000° C.

Comparative Example 1

To 4.4 g of expanded graphite having a particle size of about 130 μm was added a solution in 50 g of toluene of a mixture of 74 g of a dimethylsilicone oil (KF-96 by Shin-Etsu Chemical Co., Ltd., 10 cs) and 100 ppm of a platinum catalyst. Thorough mixing caused the expanded graphite to adsorb (or be impregnated with) the mixture. The mass was heated in air at 300° C. for one hour and further heat treated in an argon atmosphere at 1,000° C. for one hour, yielding an inorganic powder. The inorganic powder was processed into pellets and fired in air at 1,000° C. for one hour. The yield and analysis results of the C/Si/O composite material before and after the firing step are shown in Table 1 together with the results of an oxidation resistance test on the composite material in air at 1,000° C.

TABLE 1

|  | Example 1 | Example 2 | Comparative Example 1 |
|---|---|---|---|
| Yield of C/Si/O composite material (%) | 94 | 95 | 6.0 |
| Composition of C/Si/O composite material (%) | | | |
| Si | 39 | 39 | 2.5 |
| C | 39 | 40 | 96.0 |
| O | 22 | 21 | 1.5 |
| H | <0.1 | <0.1 | <0.1 |
| Yield of C/Si/O composite material after firing (%) | 85 | 87 | 2.0 |
| Composition of fired C/Si/O composite material (%) | | | |
| Si | 44 | 44 | 43 |
| C | 23 | 23 | 8 |
| O | 33 | 33 | 49 |

TABLE 1-continued

|  | Example 1 | Example 2 | Comparative Example 1 |
|---|---|---|---|
| H | <0.1 | <0.1 | <0.1 |
| Oxidation resistance of fired product (weight loss on 1000° C. × 20 hr heating in air) | −0.5% | −0.4% | * |

*not measured because only a trace was left after heating.

According to the method of the invention, a C/Si/O composite material having a sufficient oxidation resistance to find predominant use as a high-temperature structural material can be efficiently prepared through simple steps and on an industrial scale. An improved C/Si/O composite material is provided at a low cost.

Japanese Patent Application No. 2001-368167 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A method for preparing a C/Si/O composite material, comprising the steps of:

impregnating graphite with an addition reaction curing organopolysiloxane composition, causing the organopolysiloxane composition to crosslink within the graphite, and heating the graphite at a temperature of 300 to 1,200° C. in a non-oxidizing gas for reaction to take place.

2. A method for preparing a C/Si/O composite material, comprising the step of further heat treating the C/Si/O composite material obtained by the method of claim 1 at a temperature of 800 to 600° C.

3. A method for preparing a C/Si/O composite material according to claim 1 wherein the graphite is expanded graphite.

4. The method of claim 1 wherein said addition reaction curing organopolysiloxane composition comprising a silane and/or siloxane of any of the following formulae (1) to (5) and having at least two SiH groups within the molecule, and a silane and/or siloxane of any of the following formulae (1) to (5) and having at least two aliphatic unsaturated groups within the molecule, which undergoes hydrosilylation reaction to form a crosslinked product in the presence of a hydrosilylation catalyst:

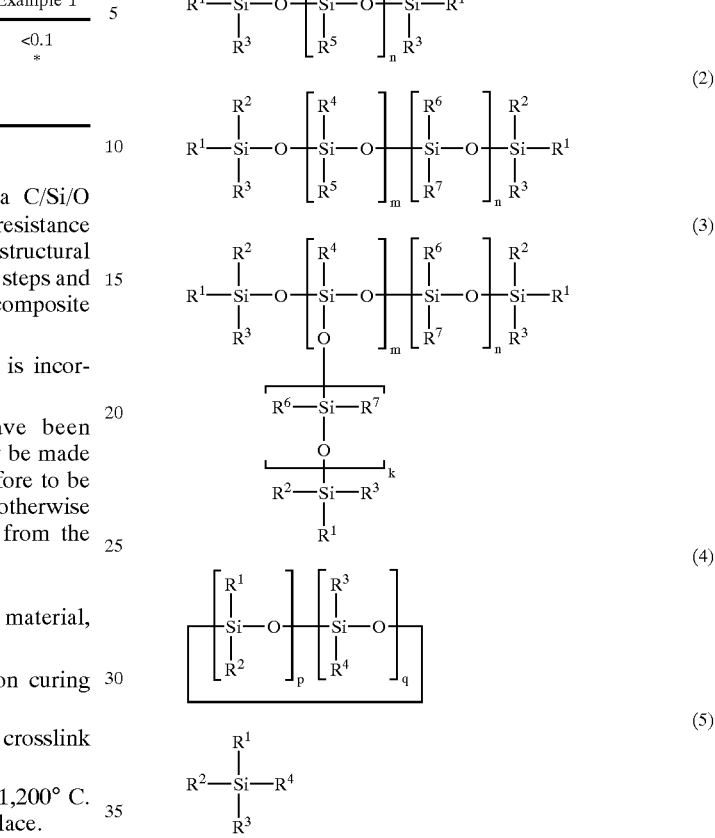

wherein $R^1$ to $R^7$ are each independently hydrogen, a hydroxyl group, hydrolysable group or monovalent hydrocarbon group, m, n and k are numbers in the range of 0 to 2,000, and p and q are numbers in the range of 0 to 10 with proviso that p and q are not 0 at the same time.

5. The method of claim 1 wherein an organosilicon compound used as the starting reactant is of the following average formula:

$$C_xH_ySiO_z$$

wherein x, y and z are positive numbers satisfying x−z>0.

* * * * *